United States Patent
Kishi

[15] 3,702,403
[45] Nov. 7, 1972

[54] OPTICAL TESTING APPARATUS COMPRISING MEANS FOR FLOWING LIQUIDS IN FREE FALL CONDITION AT CONSTANT FLOW RATE

[72] Inventor: Hirotoshi Kishi, Tokyo, Japan
[73] Assignee: Iwatsu Electric Co., Ltd., Tokyo, Japan
[22] Filed: Oct. 5, 1970
[21] Appl. No.: 78,112

[30] Foreign Application Priority Data
Nov. 15, 1969 Japan..................44/91172

[52] U.S. Cl..................250/218, 356/208, 356/246
[51] Int. Cl......G01n 1/10, G01n 21/06, G01n 21/26
[58] Field of Search......250/218; 356/244, 246, 207, 356/208

[56] References Cited
UNITED STATES PATENTS
2,535,181  12/1950  Way.................250/218 X Primary Examiner—James W. Lawrence
Assistant Examiner—T. N. Grigsby
Attorney—Robert E. Burns and Emmanuel J. Lobato

[57] ABSTRACT

Improved photo-electric colorimeter possesses a flow system, wherein one part of a liquid to be measured falls at a constant flow rate defined substantially by a slit orifice for falling thereof and a weir for overflowing the remainder of the liquid, said falling liquid being transformed by a guiding means into a successive liquid film in a position between a light source and a photo-electric cell.

10 Claims, 4 Drawing Figures

PATENTED NOV 7 1972

3,702,403

OPTICAL TESTING APPARATUS COMPRISING MEANS FOR FLOWING LIQUIDS IN FREE FALL CONDITION AT CONSTANT FLOW RATE

BACKGROUND OF THE INVENTION

The present invention relates to an improved instrument for determining liquid properties such as transmittance, turbidimetry and concentration, particularly to an improved photo-electric colorimeter.

There is a need for example, to control chemical processes whereby a small but significant change in the concentration or other properties in a liquid stream may be quickly, accurately and, if necessary, continuously determined in order to allow accurate and effective control of the process.

There are several known colorimeters with which attempts have been made to provide continuous on-stream properties' information and it is well-known that determination of the properties such as concentration may be obtained on "Lambert Beer's Law" by measuring the transmittance, that is, the ratio of light intensity passing through the stream exposed to a light source against the original intensity of the light emitting from the light source.

In the known instrument, a sample liquid exposed to the light for the measurement receives the light coming through the transparent wall of a vessel, such as a cell in which the sample liquid is lodged, or the transparent wall of a by-pass tube from the process system, through which the sample liquid continuously flows. After passing through the opposite wall, the light remaining without absorption is sensed by a photo-electric cell provided in a detector.

Such sample liquid exposing means against the light with proper transparency has a tendency to attract scale, dust or the like which gradually attaches to the transparent wall during long usage thereof. The transparency of the wall thus suffers from the resultant layer of the scale, dust etc., and the measurement of the transmittance of the liquid is effected and results in inaccuracy.

Particularly, this tendency is disadvantageous for continuous measurement of fluctuation of the on-stream properties.

The following attempts have been made to remove the resultant layer of scale or the like or to prevent attachment of the layer in advance.

a. The exposing means of the sample liquid is provided with a suitable wiper which effects a cleaning operation upon the inner-surface of the wall passing through the light.

b. The exposing means comprises a plurality of vibrating plates occupying the area of the wall through which the light passes.

c. The exposing means is provided with an oscillating means which vibrates the wall due to an ultrasonic resonance method.

Each of the above-mentioned known means suffers from certain defects and disadvantages as follows.

There is a need in the wiping means for a motor to drive the wiper and therefore, more power expenditure is required. Further, there is difficulty in sealing out the liquid from entering the transmission through which the motor drives the wiper. Still the inner surface of the wall to be cleaned suffers by being scraped or scratched by the wiper. Still further, the layer attached to the inner surface of the wall excluding the wiped area remains unwiped.

The vibrating means or oscillating means requires, for examples, a quartz crystal plate as the transparent vibrating element or oscillating element and further requires a driving means for oscillating the element. The resultant instrument is complex and more expensive.

SUMMARY OF THE INVENTION

Accordingly, a definite requirement exists in the art for an improved instrument which is not associated with the aforementioned drawbacks of the prior art. Therefore, a primary objective of the present invention is to provide such an instrument which effectively fulfills this need.

Another, more specific object of the present invention is to provide an improved colorimeter for accurately effecting on-stream determination of the solution's properties.

In order to implement these objects of the present invention, which will become more readily apparent as the description proceeds, the inventive improved instrument is manifested by the feature that the sample flow separated from a stream to be measured is further divided into two flows, one of which is effected to be in a form of a successive fall at a constant flow rate by a sample flow system, irrespective of variation in the flow rate of the separated sample, and the light coming from a light source is exposed directly to a continuous liquid film with corresponding thickness, transformed from the sample fall by a guiding means provided in the sample flow system and the light passing through the film is sensed directly by a photo-electric detector, thereby any layer for damaging the liquid properties, particularly transmittance thereof can be eliminated.

BRIEF DESCRIPTION OF THE DRAWINGS

The present invention will be better understood, when consideration is given to the following detailed description thereof, with reference to the accompanying drawings wherein.

DETAILED DESCRIPTION OF THE PREFERRED EMBODIMENT

Figure 1:
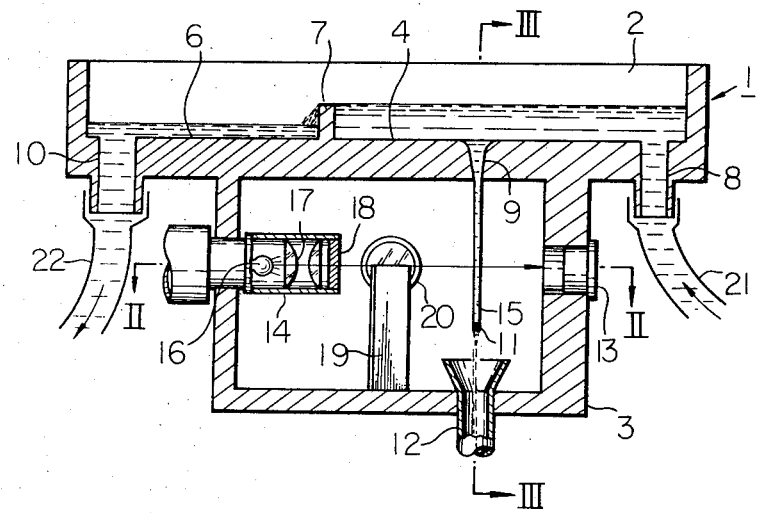
FIG. 1 is a fragmentary-sectional view of a preferred embodiment of the present invention showing a sample flow system and arrangement of the photo-electric devices.
Figure 2:
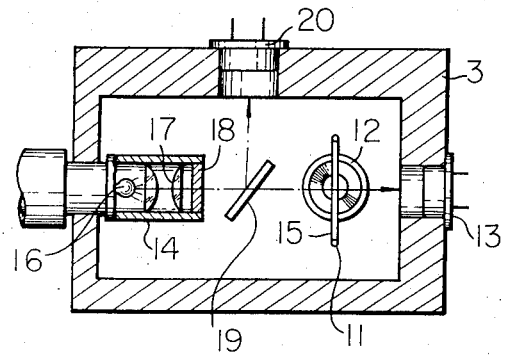
FIG. 2 is a sectional view taken along the line II—II in FIG. 1.
Figure 3:
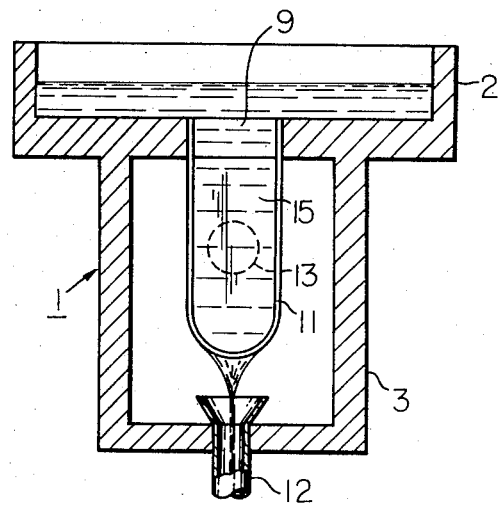
FIG. 3 is a sectional view taken along the line III—III in FIG. 1.

Describing the drawings and first considering in detail the exemplary embodiment of invention photo-electric colorimeter depicted in the figures, a flow system 1 of a sample liquid to be measured, comprises a vessel 2 mounted on a housing 3.

The vessel 2 is divided into an upstream section 4 and a downstream section 6 by a weir or a dam plate 7 which is designed to be lower than the vessel side walls in height.

The first upstream section 4 has an inlet 8 at its bottom wall near the side wall and a slit orifice or elongated opening 9 at the center of its bottom, while the second downstream section 6 has an outlet 10 at its bottom wall near the opposite side wall.

The slit orifice 9 is of a trumpet-shaped form in the transversal section respective to its longitudinal direction and the width of the section decreases downwardly as shown in FIG. 1.

There is provided within the housing 3 guiding means comprising a U-shaped wire 11 extending downwardly from both longitudinal ends of the slit orifice 9. A funnel 12 is mounted in the bottom wall of the housing 3 and its axis is aligned with that of the U-shaped wire 11 as well as the slit orifice 9.

Detecting means in the nature of a photo-electric cell 13 is mounted within the side wall of the housing 3 which extends from the bottom wall of the first section 4 and a cylinder 14 is attached to the opposite side wall in an arrangement where its axis is aligned with that of the photo-electric cell 13. Within the cylinder 14 are disposed generating means for generating electromagnetic radiation, and in this embodiment, the generating means comprises a light source 16, a pair of lenses 17 and a replaceable filter 18 at the free end of the cylinder arranged to convert the light emitting from the light source into a parallel ray by the lenses 17 and then to filter the parallel ray through the filter 18.

A mirror 19 is disposed between the free end of the cylinder 14 and the U-shaped wire 11 and stands on the bottom wall of the housing 3 in a position where half of the filtered light rays are reflected by the mirror 19 in a direction of another photo-sensitive cell 20 inserted in the side wall adjacent to the opposite side walls.

The vertical plane formed by the U-shaped wire 11 comprises a vertical flow path and is positioned transversally to the axis extending from the light source 16 to the photo-electric cell 13 through the lenses 14 and the filter 18. The remainder of the filtered light rays thus passes transversally through the center of the U-shaped plane and then arrive at the photo-electric cell 13..

The inlet 8 of the vessel 2 is secured to a supply pipe 21, fluidly connected to a main pipe (not shown), through which a separated sample liquid flows via an adjustable valve of the sample flow rate (not shown) into the first section 4 of the vessel 2.

A discharge pipe 22, fluidly connected to the outlet 10 of the vessel 2, terminates at an opening of the mains pipe, and a hollow extension of the funnel 12 communicates with the discharge pipe 22.

A part of the sample liquid supplied to the first section 4 flows vertically downwardly through the slit orifice 9 at a predetermined falling flow rate determined by the viscosity of the liquid, the height of the weir 7 and the area or the size of the slit orifice 9.

The remainder of the sample liquid flows over the dam plate 7 into the second section 6 and then flows out of the second section 6 through the outlet 10 thereof.

When the sample liquid is supplied at a greater flow rate than necessary to maintain the predetermined flow rate, the level of the sample liquid remaining in the first section 4 is substantially maintained at the same level as the height of the weir 7 since any excess liquid flows over the weir. Thusly, the flow of the liquid through the slit orifice 9 is maintained at a constant flow rate. In other words, the falling rate is constantly maintained irrespective of the variation in the supplying rate, as long as an overflow condition is maintained as described above. It will be apparent owing to basic relations of fluid dynamics that the critical falling rate depends on the parameters; the viscosity of the liquid, which is negligible in many cases, the height of the dam 7 and the area of the slit orifice 9 in the above-mentioned condition.

The flow condition may be effected by adjustable valve, while the adjustment of the height of the dam 7 is preferable for controlling the falling rate.

The falling flow is guided downwardly along both extensions of the U-shaped wire 11 from the slit orifice 9 and the surface tension of the sample liquid effects the falling flow change to a continuous liquid film occupying the whole U-shaped plane of the guiding means 11 with a certain thickness, due to the constant falling rate. Continuously, the liquid in the form of the film gathers at the lower end of the wire 11 and then falls into the opening of the funnel 12.

The gathered liquid passes through the hollow extension of the funnel 12 and then is combined with the remainder of the sample liquid passing through the discharge pipe 22 from the outlet 10 of the second section 6. The combined flow thusly returns to the main stream via the sample flow system.

As already explained, in the sample flow system, it is most important to understand that the under-flow discharge of the vessel 2 is transformed into a continuous film having a predetermined space or width and certain thickness, irrespective of the variation in the supplying rate over that necessary to maintain the predetermined falling flow rate.

Figure 4:
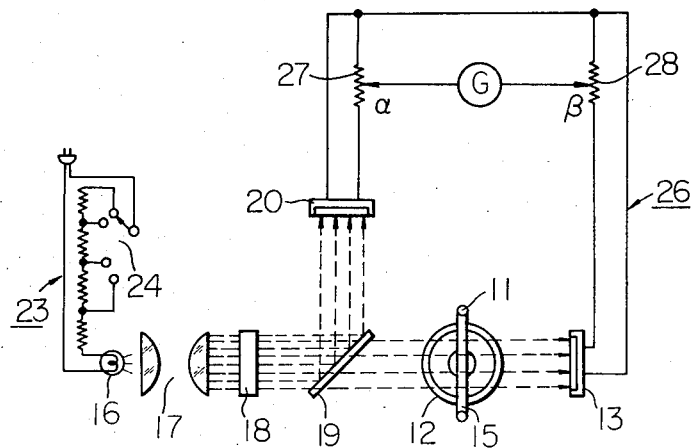
FIG. 4 is a diagrammatic view of the embodiment showing an optical system, a circuit of the potentiometer and the successive liquid film of the sample flow system.

The above-described arrangement is applied to, for example, a Fisher-type photo-electric colorimeter as shown in FIG. 4, which comprises the flow system, optical system and the photo-sensing system. Numeral 23 denotes a circuit of the light source 16, which is adjustable for light intensity due to operating a variable resistor 24. A circuit 26 of a bridge-type potentiometer is provided and includes a pair of identical slide resistors 27 and 28, a galvanometer and a pair of photo-electric cells 13 and 20 at its terminals.

In the arrangement, the photo cell 13 senses the light passing through the liquid film, while another photo cell 20 also senses original light reflected by the mirror 19 and then both cells generate signals comprising electric currents corresponding to the intensity of the light received, respectively.

For measurement, the pair of slide resistors 27 and 28 are adjusted to be in a relationship where the indicator or the galvanometer is positioned at zero point in other words, no current flows through the galvanometer.

Now, suppose that resistance values set in both resistors are $\alpha$ at the resistor 27 and $\beta$ at the opposite resistor 28, respectively, transmittance $T$ of the liquid is identical to the ratio of $\alpha$ to $\beta$;

$$T = I/Io = \alpha/\beta$$

where, $Io$ is intensity of the original light reflected by the mirror 19, while $I$ is intensity of the light passing through the continuous liquid film 15.

If the liquid is a coloidal solution, the turbidity $\tau$ of the solution is determined by measuring the transmittance $T$ due to the above-described operation and is calculated by the following equation.

$$\tau = (1/L)ln(Io/I) = (1/L)ln(1/T)$$

where, $L$ is a path length of the light in the liquid, that is, the thickness of the continuous liquid film.

Concentration $C$ of a solution, particularly of a dilute solution, is determined by comparing transmittance $T$ of the sample solution with $To$ of the reference solution, concentration $Cr$ of which is predetermined, and is calculated by the following equation derived from "Lambert Beer's Law."

$$C = Cr(lnt/lnTr)$$

where, $Tr$ is transmittance of the reference solution and may be measured by the colorimeter in advance.

As already explained, the successive liquid film exposed directly to the filtered light is constantly maintained at its thickness $L$, so that transmittance of the on-stream can be continuously measured or at any interval in the substantially same condition.

Fluctuation of the transmittance $T$, the resultant concentration $C$, the resultant turbidity $\tau$ or the like, is thus informed effectively, accurately and quickly, and this information can be applied to effective control of the on-stream properties.

As to accuracy of the measurement, it is not decreased, even through the inventive colorimeter has been utilized for a long time, because of the naked sample exposed directly to the light.

The inventive sample flow system may be applied to other types of colorimeters which are arranged with the reference liquid between the mirror 19 and the photo-electric cell 20 as in the embodiment of FIG. 4.

The reference liquid may be contained in a suitable transparent cell or vessel, or may be in the same film as the sample liquid. Further, a plate having the same transmittance as the reference liquid may be used as an alternative reference.

In the modification, the photo-electric cell 20 receives light passing through the reference instead of the original light. Ratio of resistance $\alpha$ to $\beta$ is identical with that of $I$ to $IR$;

$$I/Io = \alpha/\beta$$

Unknown concentration of the solution is determined by the following equation.

$$C = Cr + °1/\Sigma l)ln(\alpha/\beta),$$

where, $\Sigma$ is absorptivity.

The instruments as described above are to be understood merely as examples for carrying out the present invention and that variations may be made to the instrument within the spirit and scope of the present invention.

It will be apparent for example that the type of photo-electric detector used may be varied and it will also be apparent that the stream itself may flow into the inventive flow system without separation thereof.

The guiding means may be a pair of downwardly parallel extensions from the longitudinal ends of he slit orifice.

What we claim is:

1. In an instrument for determining physical properties of a liquid, such as transmittance, turbidity and concentration: means receptive of a liquid during use of the instrument for flowing the liquid along a predetermined flow path; means positioned along said flow path for receiving a portion of the liquid flowing therealong and vertically flowing same in a free fall condition at a substantially constant flow rate along a vertical flow path; generating means for generating electromagnetic radiation and directing same towards the vertically flowing liquid; and detecting means for receiving the electromagnetic radiation passing through the liquid and developing a corresponding output signal representative of the amount of radiation passing through the liquid.

2. An instrument according to claim 1; wherein said means for receiving a portion of the liquid and vertically flowing same at a substantially constant flow rate includes means defining an elongated opening positioned along a portion of said predetermined flow path for receiving therethrough said portion of the liquid and delivering same to said vertical flow path, and means disposed along said predetermined flow path downstream from said elongated opening for maintaining a substantially constant pressure head of liquid in the vicinity of said elongated opening whereby the liquid flows vertically downwardly along said vertical flow path at a substantially constant flow rate.

3. An instrument according to claim 2; wherein said means for maintaining a substantially constant pressure head of liquid comprises a weir positioned in said predetermined flow path downstream from said elongated opening and extending transversely across said predetermined flow path whereby any excess liquid not needed to maintain said substantially constant pressure head of liquid flows over said weir.

4. An instrument according to claim 1; wherein said means for receiving a portion of the liquid comprises means defining an elongated opening positioned along a portion of said predetermined flow path for receiving therethrough said portion of the liquid, and guiding means cooperative with said elongated opening for guiding the liquid flowing therethrough vertically downwardly in a continuous liquid film.

5. An instrument according to claim 4; wherein said guiding means comprises a pair of vertically extending wires each connected at one end to one of the longitudinal end portions of said elongated opening and being spaced apart from each other a distance effective to cause the vertically flowing liquid to adhere thereto due to the liquid surface tension and form a continuous vertically flowing liquid film.

6. An instrument according to claim 5; wherein said means for receiving a portion of the liquid and vertically flowing same at a substantially constant flow rate includes means disposed along said predetermined flow path downstream from said elongated opening for maintaining a substantially constant pressure head of liquid in the vicinity of said elongated opening whereby the liquid flows vertically downwardly along said vertical flow path at a substantially constant flow rate.

7. In an instrument for determining liquid properties such as transmittance, turbidity and concentration: means receptive of a liquid during use of the instrument for forming a liquid flow falling downwards comprising means defining a slit opening through which the liquid falls downwards and guiding means for guiding the falling liquid including two wire portions lying in a vertical plane which extends downwardly from said slit opening whereby a thin continuous liquid film is formed; a light source positioned on one side of said vertical plane for emitting suitable light; and a photo-electric detector positioned on the other side of said vertical plane for sensing light emitted from said light source passing through the falling liquid film.

8. An instrument as claimed in claim 7; wherein said guiding means comprises a U-shaped wire extending downwardly from the longitudinal ends of said slit opening.

9. In an instrument for determining liquid properties such as transmittance, turbidimetry and concentration: forming means receptive of a liquid during use of the instrument for forming a liquid flow falling downwards comprising a vessel divided by a dam plate into an upstream section and a downstream section, an inlet in said upstream section for supplying the liquid, means defining a slit opening in a bottom portion of said upstream section through which one part of the liquid falls, and an outlet in said downstream section for discharging the remainder of the liquid which flows over said dam plate from said upstream section; a light source for emitting suitable light; and a photo-electric detector for sensing light emitted from said light source passing through the falling liquid.

10. An instrument as claimed in claim 9; including a U-shaped wire extending downwardly from the longitudinal ends of said slit opening effective to form a thin continuous liquid film; and means positioning said light source and detector so that light emitted from said light source passes through the liquid film and is received by said detector.

* * * * *